(12) United States Patent
Rapp et al.

(10) Patent No.: US 11,142,036 B2
(45) Date of Patent: Oct. 12, 2021

(54) AIR-CONDITIONING CIRCUIT FOR A HYBRID MOTOR VEHICLE, AND METHOD FOR PREHEATING A MOTOR VEHICLE BATTERY OF A HYBRID MOTOR VEHICLE

(71) Applicant: Dr. Ing. h.c. F. Porsche Aktiengesellschaft, Stuttgart (DE)

(72) Inventors: Tobias Rapp, Weissach (DE); Thomas Tscheppe, Oetiqheim (DE); Udo Hoefer, Friolzheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 709 days.

(21) Appl. No.: 14/930,722

(22) Filed: Nov. 3, 2015

(65) Prior Publication Data

US 2016/0129754 A1    May 12, 2016

(30) Foreign Application Priority Data

Nov. 10, 2014   (DE) ...................... 10 2014 116 350.8

(51) Int. Cl.
  *B60H 1/00*    (2006.01)
  *B60L 58/27*    (2019.01)
  *B60W 10/30*    (2006.01)

(52) U.S. Cl.
  CPC ......... *B60H 1/00278* (2013.01); *B60H 1/004* (2013.01); *B60H 1/00914* (2013.01);
  (Continued)

(58) Field of Classification Search
  CPC ................ B60H 1/00278; B60H 1/004; B60H 1/00878; B60H 2001/00307;
  (Continued)

(56) References Cited

U.S. PATENT DOCUMENTS

| | | |
|---|---|---|
| 6,394,210 B2 | 5/2002 | Matsuda |
| 2001/0040061 A1 | 11/2001 | Matsuda |

(Continued)

FOREIGN PATENT DOCUMENTS

| | | |
|---|---|---|
| JP | 2001037009 A | 2/2001 |
| JP | 2013060066 A | 4/2013 |
| WO | 2011/085760 | 7/2011 |

*Primary Examiner* — Harry E Arant
(74) *Attorney, Agent, or Firm* — Gerald E. Hespos; Michael J. Porco; Matthew T. Hespos

(57) ABSTRACT

An air-conditioning circuit for a hybrid vehicle has a charge-air cooler (12) for cooling charge air for a turbocharger of a combustion engine with a cooling medium, a low-temperature cooler (14) for cooling the cooling medium of the charge-air cooler (12), and an air-conditioning condenser (18) for dehumidifying conditioning air for air-conditioning a vehicle interior with the aid of a cooling liquid. The air-conditioning condenser (18) is connectable to the low-temperature cooler (14) for cooling the cooling liquid of the air-conditioning condenser. A temperature-control line (22) controls a temperature of a motor vehicle battery (24). The air-conditioning condenser (18) is connectable to the temperature-control line (22) for heating the motor vehicle battery (24). The required cooling power of the low-temperature cooler (14) can be reduced by cooling both the cooling medium of the charge-air cooler (12) and the cooling liquid of the air-conditioning condenser (18) in the low-temperature cooler (14).

6 Claims, 5 Drawing Sheets

(52) U.S. Cl.
CPC ............. *B60L 58/27* (2019.02); *B60W 10/30*
(2013.01); *B60H 2001/00307* (2013.01); *Y10S
903/903* (2013.01)

(58) Field of Classification Search
CPC .. B60H 1/00899; B60L 11/1875; B60L 58/24;
B60L 1/02; B60L 2240/36; B60L
2240/45; B60L 2240/545
See application file for complete search history.

(56) References Cited

U.S. PATENT DOCUMENTS

| | | | |
|---|---|---|---|
| 2004/0050543 A1* | 3/2004 | Kim | F01P 3/18 |
| | | | 165/202 |
| 2012/0018127 A1* | 1/2012 | Iwasaki | F02B 29/0412 |
| | | | 165/104.14 |
| 2014/0041826 A1* | 2/2014 | Takeuchi | B60L 1/02 |
| | | | 165/10 |
| 2014/0193683 A1* | 7/2014 | Mardall | H01M 2/1077 |
| | | | 429/99 |
| 2016/0001635 A1* | 1/2016 | Noda | B60H 1/00921 |
| | | | 62/160 |

* cited by examiner

AIR-CONDITIONING CIRCUIT FOR A HYBRID MOTOR VEHICLE, AND METHOD FOR PREHEATING A MOTOR VEHICLE BATTERY OF A HYBRID MOTOR VEHICLE

CROSS REFERENCE TO RELATED APPLICATION

This application claims priority under 35 USC 119 to German Patent Appl. No. 10 2014 116 350.8 filed on Nov. 10, 2014, the entire disclosure of which is incorporated herein by reference.

BACKGROUND

1. Field of the Invention

The invention relates to an air-conditioning circuit for a hybrid motor vehicle and to a method for preheating a motor vehicle battery of a hybrid motor vehicle to set a suitable operating temperature for the motor vehicle battery.

2. Description of the Related Art

WO 2011/085760 A1 discloses a refrigerating machine of an air-conditioning system of a motor vehicle to be used to cool and dehumidify air. The dehumidified air subsequently can be heated and conducted at a desired temperature from the air-conditioning system into an interior compartment of the motor vehicle. The heat generated in a refrigeration circuit of the refrigeration machine in a condenser can be absorbed from a further circuit by way of a first heat exchanger and used for controlling the temperature of a motor vehicle battery. The further circuit has a heater that is connected in parallel with the first heat exchanger, and a second heat exchanger connected in parallel, by means of which the dehumidified air is heated. The volume flows of a refrigerant through the first heat exchanger, through the heater and through the second heat exchanger can be split up suitably to set a particular temperature for the temperature control of the motor vehicle battery.

There is a constant demand to control the temperature of a traction battery of a hybrid motor vehicle in an energy-efficient manner. Accordingly, it is an object of the invention to provide an energy-efficient temperature control of a motor vehicle battery, in particular a traction battery of a hybrid motor vehicle.

SUMMARY

The invention relates to an air-conditioning circuit for a hybrid motor vehicle. The air-conditioning circuit has a charge-air cooler that uses a cooling medium for cooling charge air for a turbocharger of a combustion engine. The air-conditioning circuit further has a low-temperature cooler for cooling the cooling medium of the charge-air cooler and an air-conditioning condenser for dehumidifying conditioning air for air-conditioning an interior compartment of the hybrid motor vehicle with the aid of a cooling liquid. The air-conditioning condenser can be connected to the low-temperature cooler for cooling the cooling liquid of the air-conditioning condenser. A temperature-control line is provided for direct or indirect temperature control of a motor vehicle battery, in particular the traction battery for purely electric drive of the hybrid motor vehicle. The air-conditioning condenser can be connected to the temperature-control line for heating the motor vehicle battery.

The low-temperature cooler may be an air-cooled cooler, such as a front-end motor vehicle cooler that can use relative wind to cool the cooling medium for the charge-air cooler, and/or to cool the cooling liquid for the air-conditioning condenser. Here, use is made of the knowledge that, at high speeds of the hybrid motor vehicle, the charge-air cooler requires a high level of cooling power in the low-temperature cooler. However, at low speeds of the hybrid motor vehicle there are relatively minor relative-wind cooling effects. Thus, the air-conditioning condenser requires a high level of cooling power in the low-temperature cooler if the air to be dehumidified is at a correspondingly relatively high temperature and must be cooled down by the air-conditioning condenser. In this way, it is not necessary for the low-temperature cooler to be designed for the sum of the maximum demanded cooling power for the air-conditioning condenser and the charge-air cooler. Rather, adequate cooling can be achieved with an air inlet area of reduced size for the low-temperature cooler. Thus, structural space can be saved, and an energy-efficient operation can be made while avoiding over-dimensioning the low-temperature cooler.

The invention also enables the cooling liquid to be discharged into the temperature-control line. Thus, the heated cooling liquid passing from the air-conditioning condenser can be utilized to heat the motor vehicle battery so that the cooling liquid can be cooled by the motor vehicle battery. In this case, the cooling liquid of the air-conditioning condenser can be utilized directly without heat transfer between two cooling fluids of different, mutually separate cooling circuits being performed beforehand with the aid of an interposed heat exchanger. Accordingly, the required cooling power of the low-temperature cooler can be reduced, and a required heating power for heating the motor vehicle battery can be reduced. In particular when the hybrid motor vehicle is at idle, the demand for electrical power from a traction battery may be relatively low. Thus, the motor vehicle battery may cool down and fall below an optimum operating temperature. The maximum power of the air-conditioning condenser may be demanded specifically when the hybrid motor vehicle is at idle. Thus, the cooling liquid exiting the air-conditioning condenser is particularly warm, and the heat of the cooling liquid can be utilized in an energy-efficient manner for heating the motor vehicle battery. Both the cooling medium of the charge-air cooler and the cooling liquid of the air-conditioning condenser may be cooled in the low-temperature cooler. Thus, the heat of the heated cooling liquid exiting the air-conditioning condenser can be used for heating the motor vehicle battery, and the heat absorbed by the cooling liquid can be utilized further. Therefore, the required cooling power of the low-temperature cooler can be reduced and energy-efficient temperature control of the traction battery of the hybrid motor vehicle is made possible.

The air-conditioning condenser may be a water-conducting condenser. The cooling liquid, in particular cooling water, cooling oil or a refrigerant, may flow through the condenser without a phase change. The air-conditioning condenser may have a collector in which the air moisture condensed out of the cooled conditioning air can be collected and discharged. Thus, the conditioning air can be dehumidified. Subsequently, the conditioning air can be heated to a desired temperature, and a desired humidity of the conditioning air can be set by the air-conditioning condenser. The charge-air cooler can cool the charge air indirectly with the aid of the cooling medium, in particular cooling water, cooling oil or a refrigerant. The charge air may have been compressed previously by a turbocharger and cooled by the charge-air cooler before the supercharger. Cooled charge air is fed to an internal combustion engine. The temperature-control line may be part of a separate circuit in which a temperature-control liquid can be heated and/or cooled to a desired temperature to be able to set and/or regulate a desired temperature of the motor vehicle battery. The temperature-control liquid is selected to be identical to the cooling liquid of the air-conditioning condenser, so that the cooling liquid of the air-conditioning condenser can flow without problem through the temperature-control line, and there is no problem if the cooling liquid and the temperature-control liquid mix. The temperature-control liquid can flow through the motor vehicle battery and realize direct temperature control of the motor vehicle battery without an interposed heat exchange medium. The elimination of heat exchange between different heat exchange media can improve energy efficiency.

The low-temperature cooler, the air-conditioning condenser and the temperature-control line can be connected to form a preheating circuit through which the cooling liquid of the air-conditioning condenser can flow. The cooling liquid of the air-conditioning condenser can thus pass from the air-conditioning condenser, flow through the temperature-control line and subsequently through the low-temperature cooler and be recirculated to the air-conditioning condenser again. The motor vehicle battery that is temperature-controlled by the temperature-control line can in this case act as an additional cooler for the cooling liquid of the air-conditioning condenser. A "re-heat" operating mode may be carried out during electric travel of the hybrid motor vehicle so that electrical power of the motor vehicle battery is used initially to operate the air-conditioning condenser for dehumidifying the conditioning air and subsequently is used for heating the air-conditioning air. Thus, the heat of the cooling liquid exiting the air-conditioning condenser can be used expediently and in an energy-efficient manner for the temperature control of the motor vehicle battery and/or heating of the conditioning air.

The temperature-control line may have a heater for heating a temperature-control liquid in the temperature-control line. At least part of a heating power that can be provided by the heater can be branched off for heating the conditioning air that has been dehumidified by the low-temperature cooler. The heater can be used to heat the temperature-control liquid in the temperature-control line to a suitable temperature. Thus, the heater is expedient if the cooling liquid passing from the air-conditioning condenser and fed to the temperature-control line is not warm enough, or if the cooling liquid of the air-conditioning condenser and the temperature-control liquid of the temperature-control line flow in mutually separate circuits. Power of the heater may be utilized for heating the conditioning air after the conditioning air has been dehumidified by the air-conditioning condenser. Thus, the conditioning air may flow along a heated heat-exchange surface that projects out of the temperature-control line of the heater.

A high-temperature circuit may be provided for cooling the internal combustion engine and may be connected to the temperature-control line to form a common heating circuit for heating the motor vehicle battery with a cooling fluid of the high-temperature circuit. In particular, the drive power for propulsion of the hybrid motor vehicle is generated by the internal combustion engine and not by the motor vehicle battery during mechanical operation of the hybrid motor vehicle. Thus, the internal combustion engine may heat up and the motor vehicle battery may cool down during mechanical operation. The heat to be discharged from the internal combustion engine can be used to control the temperature of the motor vehicle battery so that an optimum operating temperature can be regulated both for the internal combustion engine and for the motor vehicle battery in an energy-efficient manner. A heat exchange medium of the high-temperature circuit may be identical to the temperature-control liquid of the temperature-control line. Thus, the heat exchange medium of the high-temperature circuit can flow without problems through the temperature-control line, and there are no problems if the heat exchange medium and the temperature-control liquid mix.

A bypass line may be connected to the air-conditioning condenser and to the temperature-control line and may conduct the cooling liquid of the air-conditioning condenser past the low-temperature cooler. The bypass line can be connected together with the air-conditioning condenser and the temperature-control line to form a common triangular operation circuit. In particular, if the cooling liquid of the air-conditioning condenser can be cooled down to an adequate extent in the temperature-control line by the motor vehicle battery, it is not necessary for the cooling liquid to be cooled additionally by the low-temperature cooler. Instead, the cooling power of the low-temperature cooler can be utilized for cooling the cooling medium of the charge-air cooler.

The air-conditioning condenser may be connected to the low-temperature cooler and to the temperature-control line by a condenser valve, such as a ³⁄₂ directional valve. The air-conditioning condenser may be connected to the low-temperature cooler in a first switching position of the condenser valve and may be connected to the temperature-control line in a second switching position of the condenser valve. The temperature-control line may be connected to the low-temperature cooler by way of a recirculation check valve. The mass flow of the cooling liquid easily can be conducted entirely or partially via the temperature-control line or past the temperature-control line by means of the condenser valve. The recirculation check valve can prevent cooling liquid that actually has been conducted past the temperature-control line from inadvertently passing into the temperature-control line in the opposite flow direction.

The temperature-control line may have an inlet line that can be connected to the air-conditioning condenser and an output line that can be connected to the low-temperature cooler. The inlet line and the output line can be connected to one another by a connecting line that has a shut-off valve. The connecting line can form a separate temperature-control circuit with a temperature-control compressor or pump for circulating the temperature-control liquid therethrough. The fluid connection between the inlet line and the outlet line can be shut off by the shut-off valve if the air-conditioning condenser is connected to the inlet line of the temperature-control line. Thus, the cooling liquid that is conveyed through the temperature-control line cannot be conveyed in circulating fashion in the temperature-control circuit, but can be conveyed back to the air-conditioning condenser. Thus, a high-temperature circuit for cooling the internal combustion engine to be connected to the temperature-control circuit by way of the shut-off valve.

The invention also relates to a hybrid motor vehicle having a combustion engine for purely mechanical drive of the hybrid motor vehicle, a traction battery for purely electric drive of the hybrid motor vehicle, and the above-described air-conditioning circuit for temperature control of the traction battery. Thus, the cooling medium of the charge-air cooler and the cooling liquid of the air-conditioning condenser can be cooled in the low-temperature cooler of the air-conditioning circuit. Additionally, heat of the heated cooling liquid exiting the air-conditioning condenser can be used for heating the motor vehicle battery. Accordingly, the required cooling power of the low-temperature cooler can be reduced to achieve an energy-efficient temperature control of the traction battery of the hybrid motor vehicle.

The invention also relates to a method for preheating a motor vehicle battery, such as a traction battery of a hybrid motor vehicle. The method may use the above-described air-conditioning circuit and may be carried out so that below a threshold temperature of the motor vehicle battery, the cooling liquid heated by the air-conditioning condenser is used for heating the motor vehicle battery. Thus, both the cooling medium of the charge-air cooler and the cooling liquid of the air-conditioning condenser may be cooled in the low-temperature cooler of the air-conditioning circuit. The method uses the heat of the heated cooling liquid exiting the air-conditioning condenser for heating the motor vehicle battery. Therefore, the heat absorbed by the cooling liquid can be utilized further, and the required cooling power of the low-temperature cooler can be reduced. Accordingly, the method achieves an energy-efficient temperature control of the motor vehicle battery, in particular a traction battery, of the hybrid motor vehicle.

The cooling liquid heated by the air-conditioning condenser may be used for heating the motor vehicle battery if the travelling speed of the hybrid motor vehicle lies below a threshold speed. A high power of the air-conditioning condenser is to be expected at a low travel speed, so that the cooling water of the air-conditioning condenser is at a sufficiently high temperature to heat the motor vehicle battery that has cooled down to below the threshold temperature.

The invention will be discussed by way of example with reference to the appended drawings and on the basis of exemplary embodiments. The features presented below may constitute an aspect of the invention individually and in combination.

DETAILED DESCRIPTION

Figure 1:
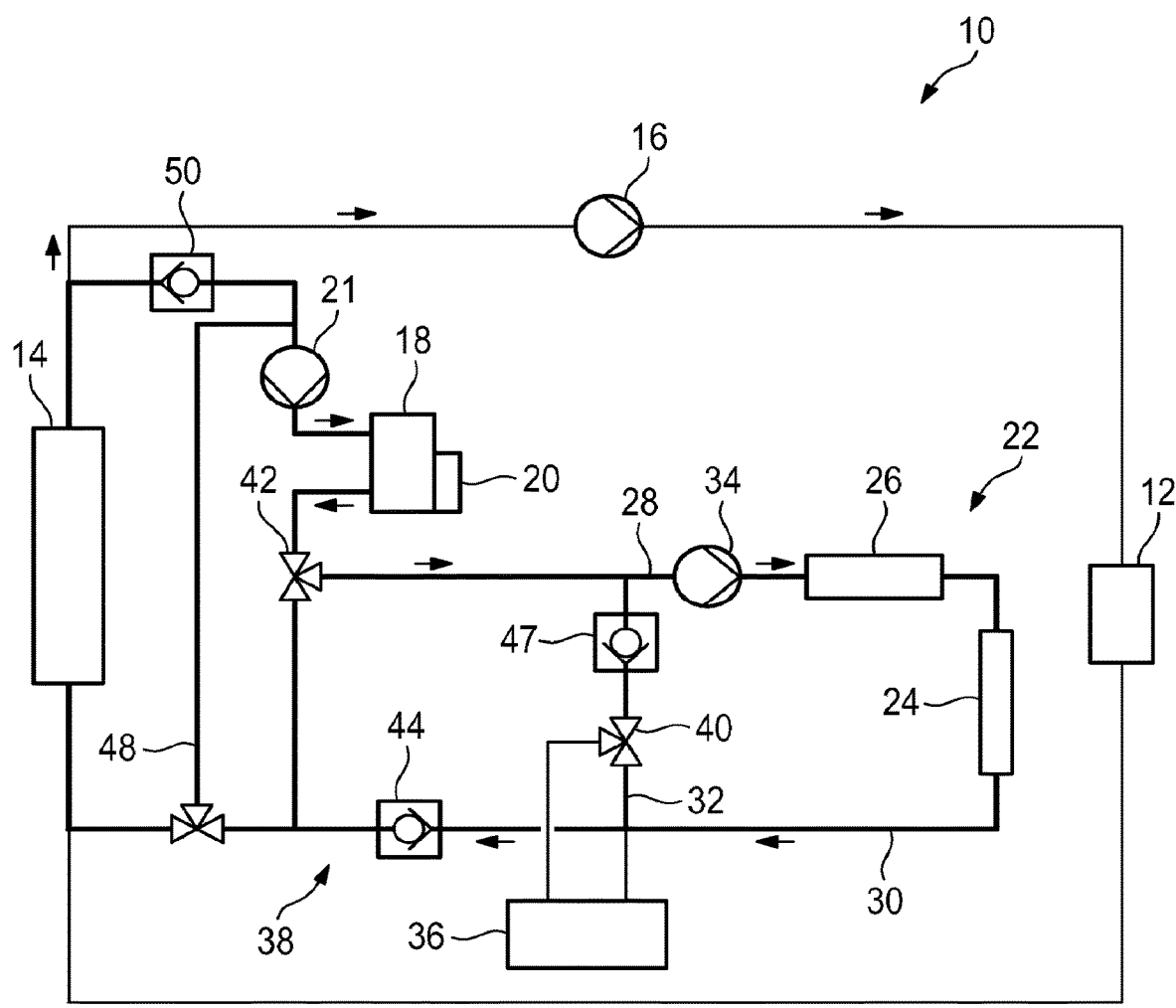
FIG. 1 is a schematic diagrammatic illustration of an air-conditioning circuit.

The air-conditioning circuit 10 of FIG. 1 has an indirect charge-air cooler 12 that is cooled by a cooling medium and is connected with a low-temperature cooler 14 for cooling the cooling medium. The cooling medium may be conveyed by a compressor 16. A water-conducting air-conditioning condenser 18 is provided for dehumidifying conditioning air and has a collector 20 for discharging the condensed moisture from the conditioning air. A cooling liquid of the air-conditioning condenser 18 can be circulated by an air-conditioning compressor 21, which is in particular in the form of a pump.

Figure 2:
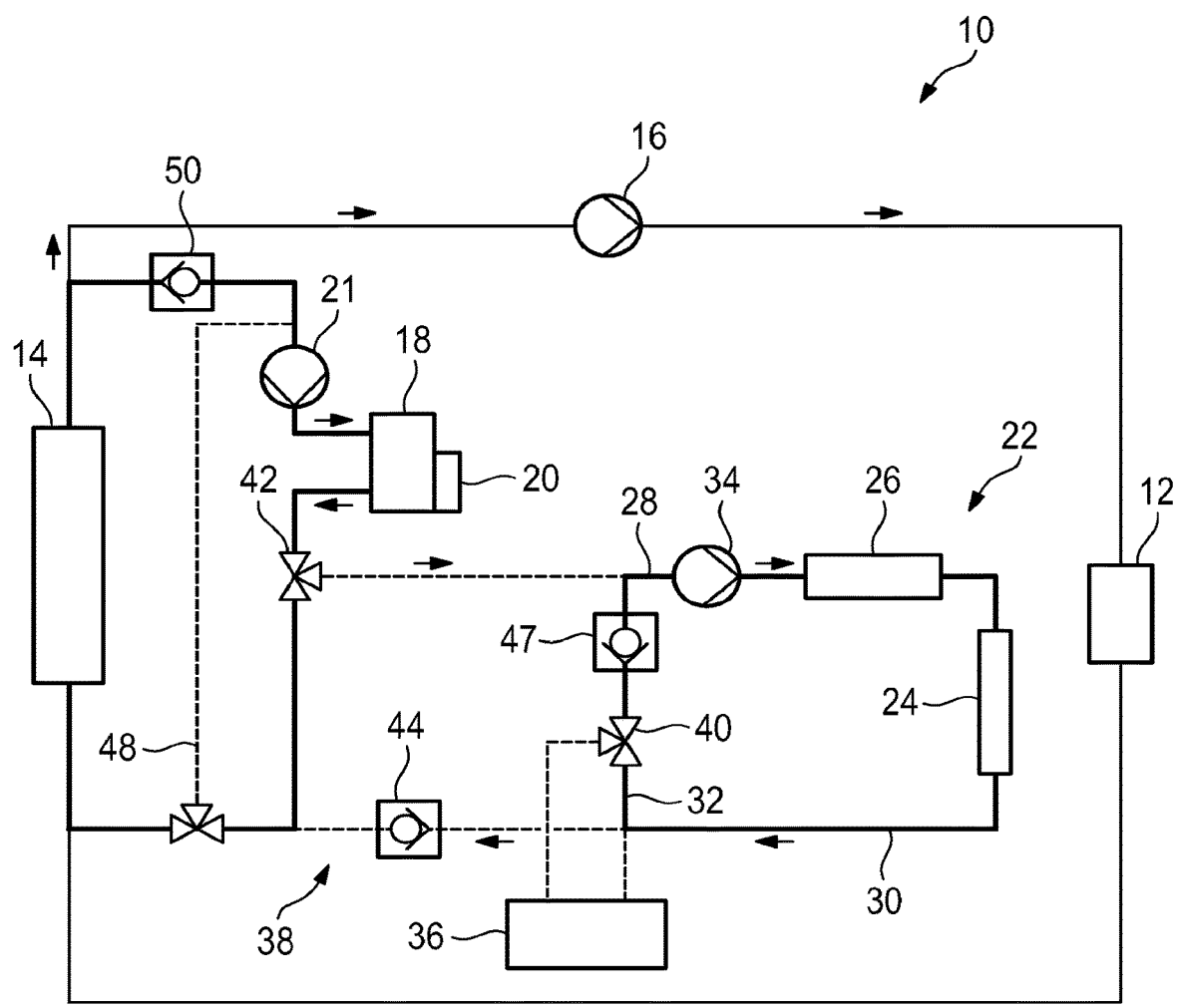
FIG. 2 is a schematic diagrammatic illustration of the air-conditioning circuit in a first switching configuration.

The cooling liquid is heated in the air-conditioning condenser 18 during the dehumidification of the conditioning air and, as shown in FIG. 2, also can be cooled in the low-temperature cooler 14. Furthermore, a temperature-control line 22 is provided for the temperature control of a traction battery 24 for purely electric drive of a hybrid motor vehicle. The temperature-control line 22 may have a heater 26 for heating a temperature-control liquid of the temperature-control line 22 and/or a cooler for cooling the temperature-control liquid to set a suitable temperature for the temperature control of the battery 24. The temperature-control line 22 may have an inlet line 28 that leads to the motor vehicle battery 24, and an outlet line 30 that leads away from the motor vehicle battery 24. The inlet and outlet lines can be connected via a connecting line 32 to form a common circuit. The temperature-control liquid can be circulated by a temperature-control compressor 34.

Figure 3:
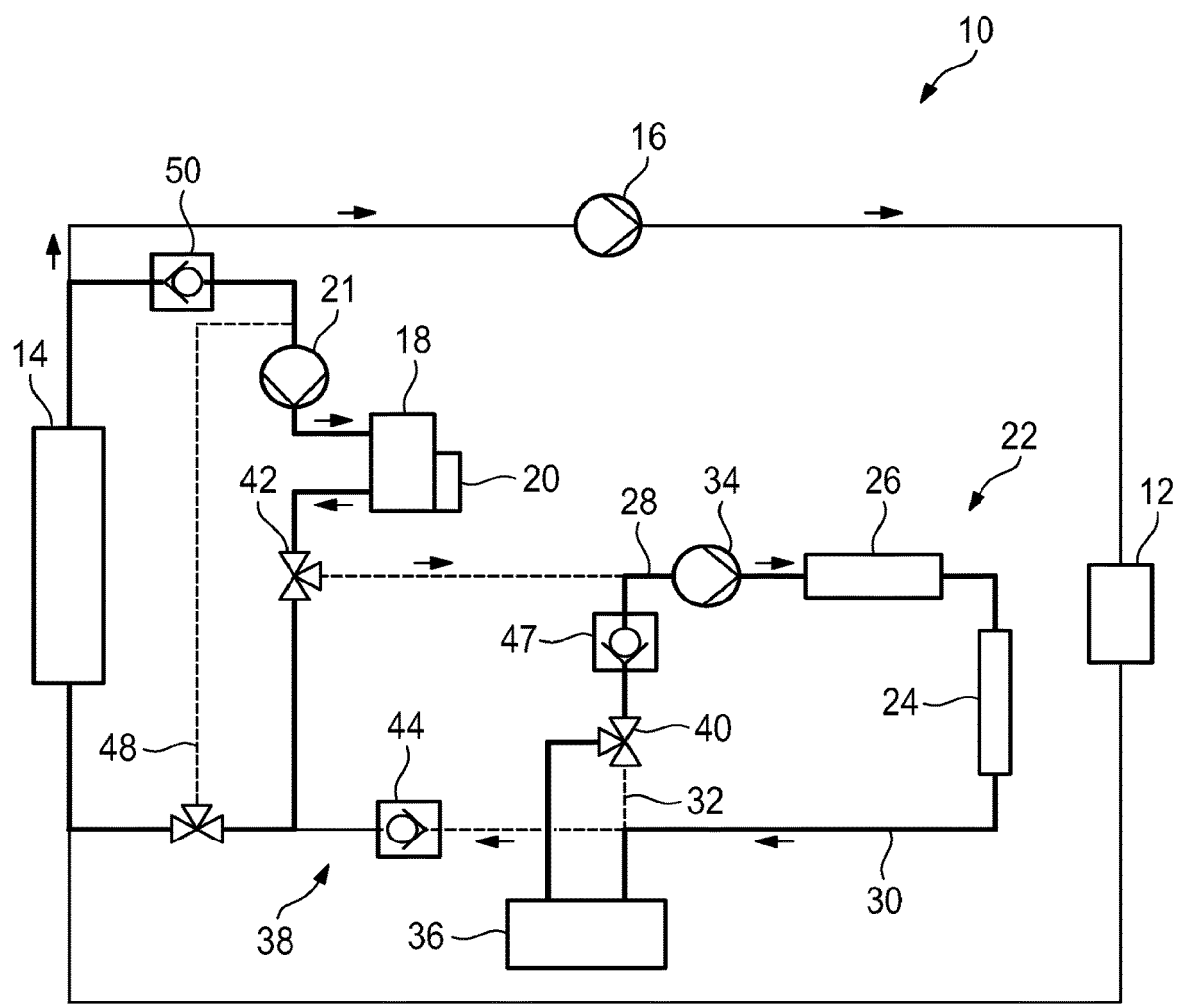
FIG. 3 is a schematic diagrammatic illustration of the air-conditioning circuit in a second switching configuration.

As illustrated in FIG. 3, a high-temperature circuit 36 may be connected to the temperature-control line 22 for cooling a combustion engine of the hybrid motor vehicle. Thus, the temperature-control line 22 and the high-temperature circuit 36 form a common heating circuit 38. For this purpose, a cooling fluid of the high-temperature circuit 36 can be fed via a shut-off valve 40 provided in the connecting line 32, and can be supplied to the high-temperature circuit again via the outlet line 30.

Figure 4:
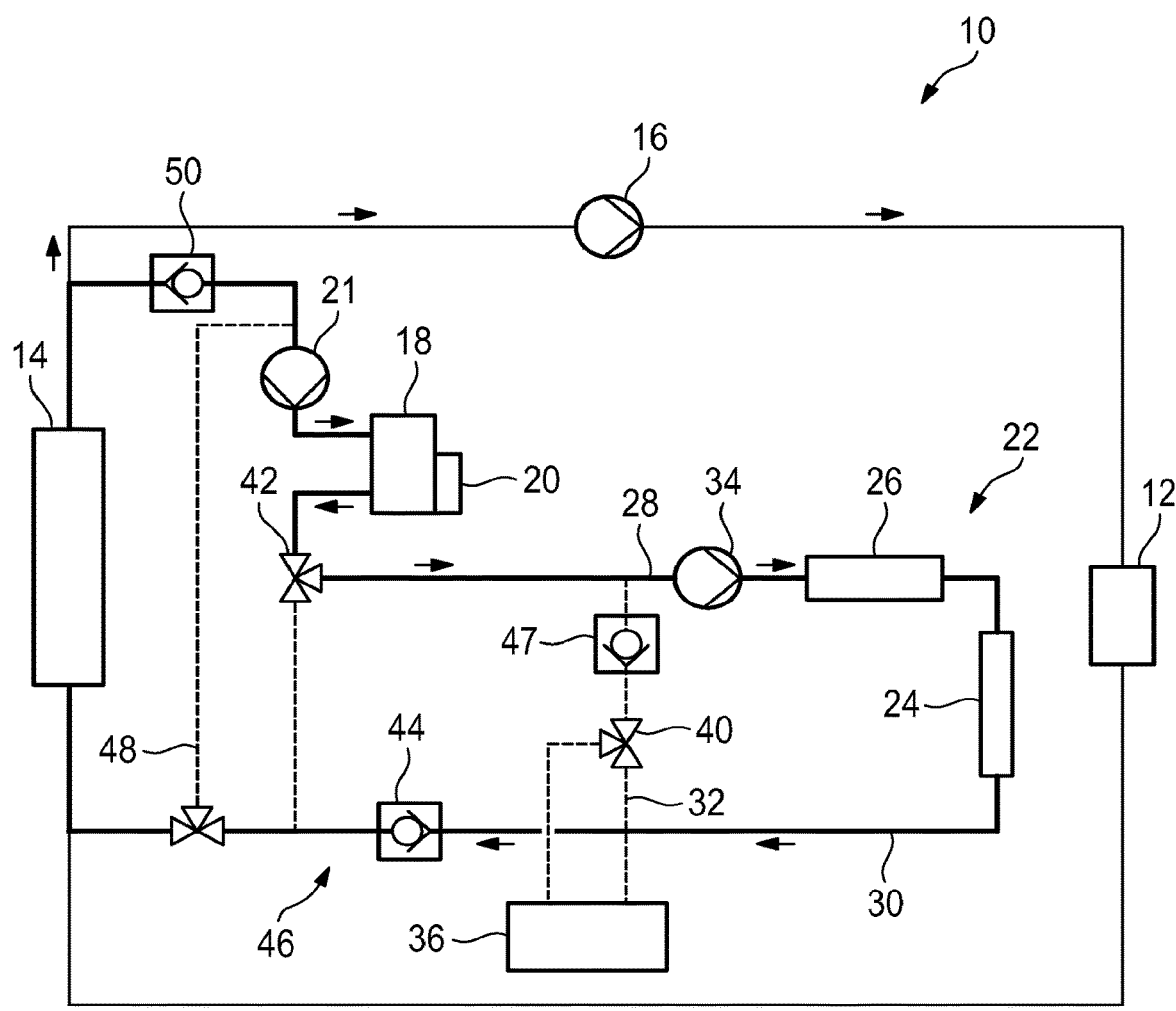
FIG. 4 is a schematic diagrammatic illustration of the air-conditioning circuit in a third switching configuration.

As illustrated in FIG. 4, a 3/2 directional condenser valve 42 enables the air-conditioning condenser 18 to be connected selectively to the inlet line 28 of the temperature-control line 22. Thus, the outlet line 30 can recirculate the cooling liquid of the air-conditioning condenser 18 via a recirculation check valve 44 to the low-temperature cooler 14 and to the air-conditioning condenser 18. The low-temperature cooler 14, the air-conditioning condenser 18 and the temperature-control line 22 may form a common preheating circuit 46. The shut-off valve 40 and/or a connecting check valve 47 in the connecting line 32 can prevent a bypass flow past the motor vehicle battery 24 via the connecting line 32.

Figure 5:
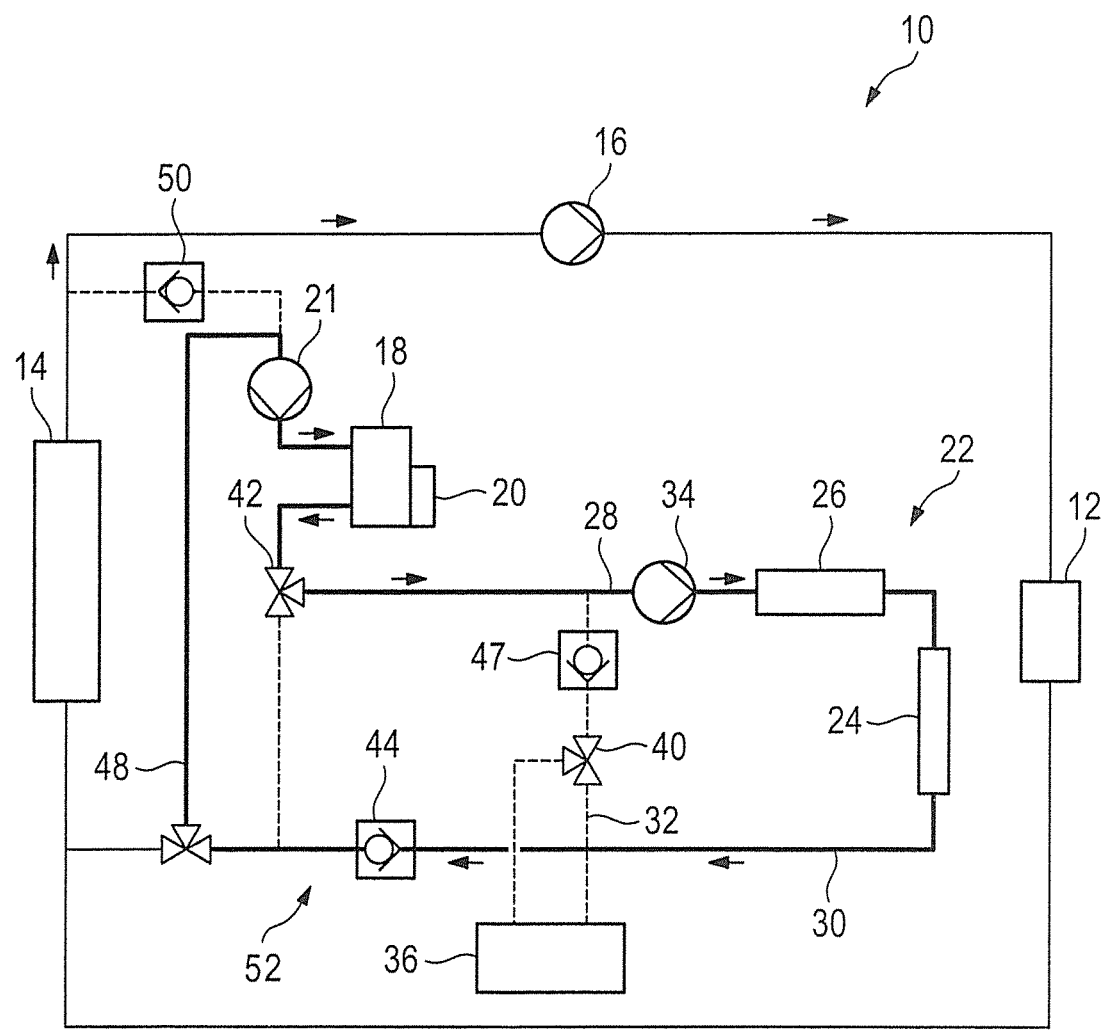
FIG. 5 is a schematic diagrammatic illustration of the air-conditioning circuit in a fourth switching configuration.

FIG. 5 differs from FIG. 4 in that a bypass line 48 and a bypass valve enables the cooling liquid passing from the temperature-control line 22 to be conducted past the low-temperature cooler 14. An air-conditioning check valve 50 is provided between the low-temperature cooler 14 and the bypass line 48 to prevent a flow of the cooling liquid in an opposite flow direction through the low-temperature cooler 14. The air-conditioning condenser 18 and the temperature-control line can thus form a common triangular operation circuit 52 without the low-temperature cooler 14.

What is claimed is:

1. A hybrid motor vehicle comprising: a combustion engine for purely mechanical drive of the hybrid motor vehicle; a traction battery for purely electric drive of the hybrid motor vehicle; and an air-conditioning circuit for temperature control of the traction battery, the air-conditioning circuit comprising:
a charge-air cooler for cooling charge air for a turbocharger of the combustion engine of the hybrid motor vehicle with the aid of a temperature-control medium;
a low-temperature cooler for cooling the temperature-control medium;
an air-conditioning condenser of an air-conditioning apparatus for air-conditioning a vehicle interior compartment of the hybrid motor vehicle with the aid of the temperature control medium;
a temperature-control line with a heater for heating the temperature-control medium in the temperature control line for achieving a direct or indirect temperature control of the traction battery;
pumps for pumping the temperature-control medium through the air-conditioning circuit; and valves including a 3/2 directional condenser valve, the air-conditioning condenser being connected to the low-temperature cooler and to the temperature-control line by the 3/2 directional condenser valve, the valves being disposed so that:

in a first set of valve positions, the 3/2 directional condenser valve connects the air-conditioning condenser to the low-temperature cooler for cooling the temperature-control medium upstream of the charge air cooler thereby further cooling the charge air of the turbocharger, and the valves in the first set of valve positions form a separate circuit that connects the heater and the traction battery; and in a second set of valve positions, the 3/2 directional condenser valve connects the air-conditioning condenser in series to the heater in the temperature-control line, the traction battery, and then to low-temperature cooler by way of a recirculation check valve to form a circuit that first heats the temperature control medium in the heater for heating the traction battery and then cools the temperature control medium in the low temperature cooler for cooling the charge air.

2. An air-conditioning circuit for a hybrid motor vehicle that has combustion engine and that also has a traction battery for purely electric drive of the hybrid motor vehicle, comprising:

a charge-air cooler for cooling charge air for a turbocharger of the combustion engine of the hybrid motor vehicle with the aid of a temperature-control medium;

a low-temperature cooler for cooling the temperature-control medium;

an air-conditioning condenser of an air-conditioning apparatus for air-conditioning a vehicle interior compartment of the hybrid motor vehicle with the aid of the temperature control medium;

a temperature-control line with a heater for heating the temperature-control medium in the temperature control line for achieving a direct or indirect temperature control of the traction battery;

pumps for pumping the temperature-control medium through the air-conditioning circuit; and valves including a 3/2 directional condenser valve, the air-conditioning condenser being connected to the low-temperature cooler and to the temperature-control line by the 3/2 directional condenser valve, the valves being disposed so that:

in a first set of valve positions, the 3/2 directional condenser valve connects the air-conditioning condenser to the low-temperature cooler for cooling the temperature-control medium upstream of the charge air cooler thereby further cooling the charge air of the turbocharger, and the valves in the first set of valve positions form a separate circuit that connects the heater and the traction battery; and in a second set of valve positions, the 3/2 directional condenser valves connects the air-conditioning condenser in series to the heater in the temperature-control line, the traction battery, and then to low-temperature cooler by way of a recirculation check valve to form a circuit that first heats the temperature control medium in the heater for heating the traction battery and then cools the temperature control medium in the low temperature cooler for cooling the charge air.

3. The air-conditioning circuit of claim 2, wherein at least one of the valves is configured so that a heating power that can be provided by the heater can at least partially be branched off for heating conditioning air that has been dehumidified by the low-temperature cooler.

4. The air-conditioning circuit of claim 2, wherein the temperature-control line has an inlet, and the 3/2 directional condenser valves has a valve position that connects the inlet of the temperature-control line to the air-conditioning condenser, and the temperature control line further has an outlet connected to the low-temperature cooler, the inlet and the outlet of the temperature control line being connectable to one another by a connecting line that has a shut-off valve.

5. The air-conditioning circuit of claim 2, further comprising a high-temperature circuit for cooling the combustion engine, at least one of the valves connecting the high-temperature circuit to the temperature-control line to form a common heating circuit for heating the motor vehicle battery with the temperature-control medium of the high-temperature circuit.

6. The air-conditioning circuit of claim 5, further comprising a bypass line extending from a location upstream of an inlet to the low temperature cooler to a position upstream of an inlet to the air-conditioning condenser, at least one of the valves having being disposed to divert the temperature-control medium directly to the air-conditioning condenser while bypassing the low temperature cooler.

\* \* \* \* \*